United States Patent [19]
Cleary, Jr. et al.

[11] Patent Number: 4,811,395
[45] Date of Patent: Mar. 7, 1989

[54] TWO-TONE TEST SIGNAL METHOD FOR BTSC CALIBRATION

[75] Inventors: Edward J. Cleary, Jr., Aloha; Bruce E. Hofer, Beaverton, both of Oreg.

[73] Assignee: Tektronix, Inc., Beaverton, Oreg.

[21] Appl. No.: 105,644

[22] Filed: Oct. 8, 1987

[51] Int. Cl.$^4$ .............................................. H04H 5/00
[52] U.S. Cl. ........................................ 381/4; 324/475
[58] Field of Search .................... 381/2, 3, 4; 455/67, 455/72; 324/475

[56] References Cited
PUBLICATIONS

RE540 BTSC TV Stereo Generator Specification Sheet & Letter, RE Instruments, 31029 Center Ridge Rd., Westlake, Ohio 44145, 9/17/86.

*Primary Examiner*—Forester W. Isen
*Attorney, Agent, or Firm*—Francis I. Gray

[57] ABSTRACT

A two-tone test signal method for calibrating a BTSC monitoring system compensates for errors introduced into the monitoring system by unpredictable high frequency components of noise when testing the low frequency performance characteristics of the monitoring system. The two-tone test signal has a low frequency tone and a lower level high frequency tone which overrides the high frequency component of noise. The two-tone test signal is synthesized according to the BTSC specification to produce a "perfect" left-only signal for both tones.

4 Claims, 3 Drawing Sheets

TWO-TONE TEST SIGNAL METHOD FOR BTSC CALIBRATION

BACKGROUND OF THE INVENTION

The present invention relates to testing a stereo audio television system, and more particularly to a two-tone test signal method for calibrating a monitoring system for a BTSC broadcast system which compensates for high frequency noise when the low frequency range of the monitoring system is tested.

The BTSC stereo audio system for broadcast television combines left and right audio channels into L+R and L−R components. The L+R component is transmitted in a conventional manner as a baseband Main (M) sum component, and the L−R component is transmitted as a double sideband, suppressed carrier signal at a frequency above the L+R component as a Difference (D) component as shown in FIG. 1. The L+R component is processed in a linear manner for both transmission and reception, but the L−R component is "companded" in a nonlinear manner for noise reduction, i.e., compressed before transmission and expanded after reception. To recover the original left and right audio channels, the sum and difference components are added and subtracted. Proper recovery is critically dependent upon recovering the sum and difference components with exactly correct phase and amplitude.

For stereo audio poor quality is demonstrated most obviously by lack of channel separation. Separation is defined as the amplitude ratio between channels when only one channel is excited. This signal channel separation is expressed in terms of decibels, such as −60 dB for a typical value. To measure the performance of the compression and transmission system, a monitoring system requires an expander which accurately implements the BTSC specification to accurately recover the L−R component from the transmitted D component.

One obvious method of calibrating the monitoring system is to introduce a single test tone at each of several representative audio frequencies and to determine the response of the system at each frequency. Due to the nonlinear nature of the compression and expansion, the low and high frequency portions of the D component are subjected to different amounts of compression and expansion as illustrated in FIG. 2. For ideal theoretical situations such a single tone test calibration system would be sufficient, but in the real world there is a certain amount of noise present across the frequency spectrum introduced by the electronic components themselves. For high frequency test tones the noise has virtually no impact. However for low frequency test tones the high frequency component of the noise has a significant effect. Even nose at 80 dB below the test tone causes the "spectral" expander to alter the phase and amplitude of the processed signal so that stereo separation is reduced and the measurement of the stereo separation of an actual signal is in error. The effect of noise is illustrated graphically in FIG. 3 where the effect of noise at 10 kHz on the phase, expander gain and separation limit for a 300 Hz test tone is shown. Since the noise is unpredictable, the net effect is to decrease the ability of the monitoring system to accurately measure signal separation. It is very difficult to realize a signal-to-noise ratio (S/N) high enough to avoid this effect.

It should be noted that the high frequency noise problem does not arise in an actual BTSC system receiving a broadcast signal since the noise at the output of the BTSC compressor at the transmitter in the absence of high frequency input signals is large compared with that added by the receiver and expander circuits. Thus the compressor and expander are "seeing" the same amount of noise and there is no mistracking. However when the expander is seeing noise that the compressor does not see, such as simulated test signals from a "perfect" noise free compressor, then any added noise ahead of the expander causes the mistracking as described above.

Therefore what is desired is a method for testing a BTSC stereo audio monitoring system which keeps unpredictable and uncontrolled noise from affecting the performance measurements.

SUMMARY OF THE INVENTION

Accordingly the present invention provides a two-tone test signal method for calibrating a BTSC stereo audio monitoring system. For testing the characteristics of the monitoring system having a BTSC expander at the low frequency end of its response, a low frequency test tone is used in conjunction with a high frequency test tone within the frequency range of the high frequency end of its response. The two-signal test tone has both a baseband Main (M) sum component and a compressed suppressed carrier Difference (D) component with amplitude ratios and phase differences computed according to the BTSC compression specification. The lower frequency is that for which a stereo separation measurement is desired. The higher frequency is chosen to be high enough in amplitude to override any high frequency noise, but still low enough so that after processing it does not interfere with the stereo separation measurement.

The objects, advantages and novel features of the present are apparent from the following detailed description when read in conjunction with the appended claims and attached drawing.

DESCRIPTION OF THE PREFERRED EMBODIMENT

Figure 4:
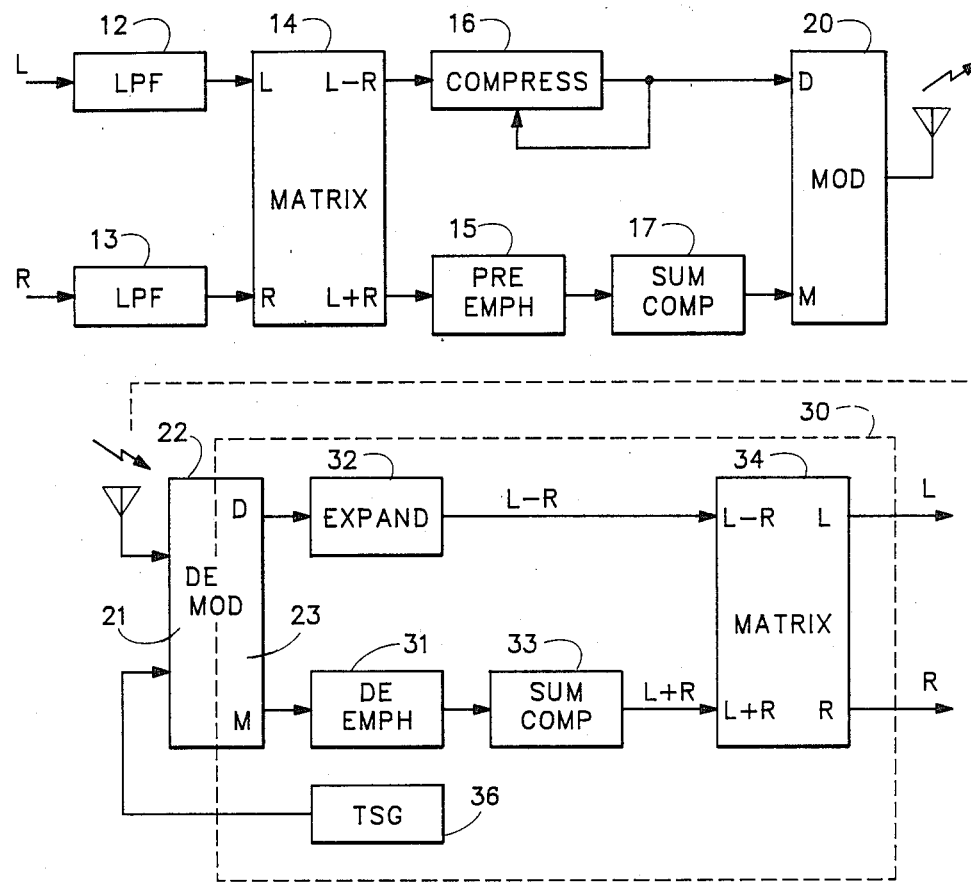
FIG. 4 is a block diagram view of a BTSC stereo audio broadcast system using compression of the L−R component.
Figure 1:
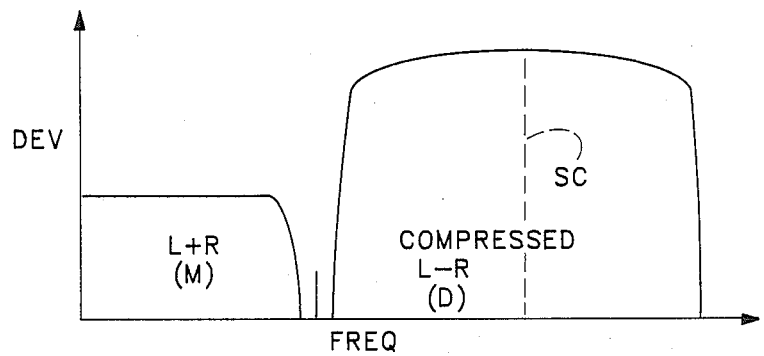
FIG. 1 is a frequency domain representation of a BTSC stereo audio signal.

Referring now to FIG. 4 a BTSC stereo audio broadcast system is shown having signals from left L and right R audio channels being input to respective input low pass filters 12, 13. The two channels are combined in a matrix 14 to produce L+R and L−R stereo components. The L+R component is passed through a pre-emphasis circuit 15 and a compensation circuit 17 along a linear signal processing path to provide a baseband Main (M) sum component for transmission. The L−R component is input to a compression circuit 16, the output of which is fed back to the input of the compression circuit to compress he dynamic range of the L−R component to form a compressed Difference (D) component. The M and D components are input to a modulator circuit 20 for transmission as a BTSC signal as shown in FIG. 1. To verify proper operation of the BTSC broadcast system, i.e., proper left/right channel separation, the transmitted BTSC signal is input to a demodulator 22 to recover the M and D components. A baseband demodulator portion 21 of the demodulator 22 is conventionally a separate device, while a suppressed carrier demodulator portion 23 may be part of a test instrument 30. The M and D components are processed essentially in reverse by the test instrument 30. The M component is deemphasized by a de-emphasis circuit 31, inverse compensated by a receiver compensating circuit 33 and input to a matrix circuit 34. The D component is expanded by an expander circuit 32 to produce the L−R component which also is input to the matrix circuit 34. The outputs of the matrix circuit 34 are the two stereo audio signals L and R from which separation measurements are obtained. For calibration of the test instrument 30 a test signal from an appropriate test signal generator 36 is input to the demodulator 22 for processing in lieu of a broadcast signal, the test signal corresponding to M and D components from a "perfect" noise free compressor.

Figure 5:
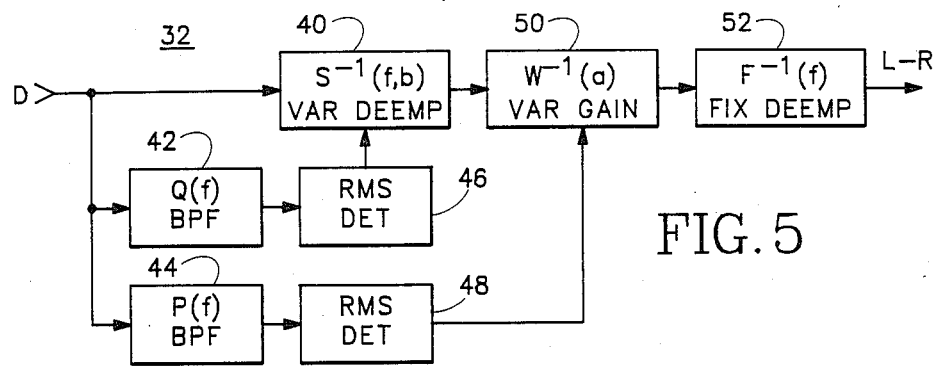
FIG. 5 is a block diagram view of a BTSC expander.
Figure 6A:
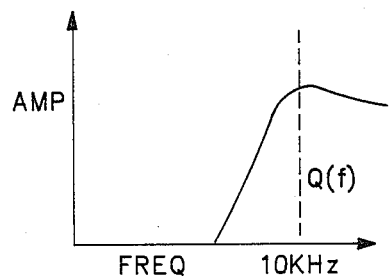
FIGS. 6(a) and 6(b) are filter response characteristics for the expander of FIG. 5.
Figure 6B:
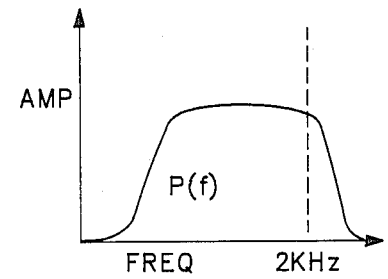

Ideally adding the L+R and L−R components produces only the L audio channel, and subtracting the L+R component from the L−R component produces only the R audio channel. However in actuality some audio from one channel spills over into the other channel. The function of the test instrument 30 is to recover the L and R channels as they are represented in the transmitted BTSC signal without introducing any error which could result in an erroneous channel separation measurement. The M signal processing path is linear, but the D signal processing path is nonlinear, as is apparent from reviewing the expander circuit 32 in greater detail as shown in FIG. 5. The D component is input to a variable de-emphasis circuit 40 having a transfer function $S^{-1}(f,b)$, and to two band pass filters 42, 44 having respective characteristics Q(f), P(f) as shown in FIGS. 6(a) and 6(b). The outputs of the band pass filters 42, 44 are input to respective rms detectors 46, 48. The output of the first rms detector 46 is input to the variable de-emphasis circuit 40 which performs the function of a spectral expander. The output of the second rms detector 48 is input to a variable gain circuit 50 having a transfer function $W^{-1}(a)$ to which also is input the output of the variable de-emphasis circuit 40. The variable gain circuit 50 acts as a wide band expander. Finally the output of the variable gain circuit 50 is input to a fixed de-emphasis circuit 52 which acts as an equalizer and provides the final L−R output to the matrix circuit 34.

Figure 7:
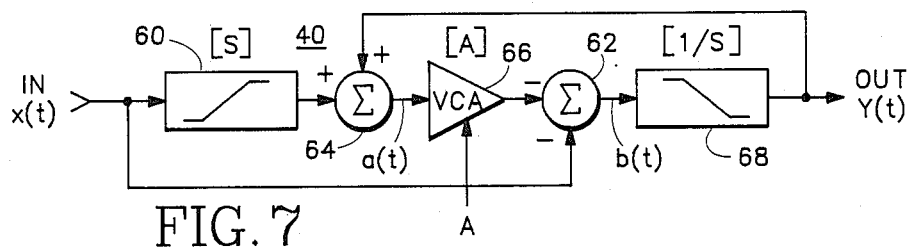
FIG. 7 is a simplified block diagram of a portion of the expander of FIG. 5.

To understand the operation of the variable de-emphasis circuit 40 the input signal is input as x(t) to a pre-emphasis circuit 60 having a transform defined as S, and to a subtractor 62 as shown in FIG. 7. The output of the pre-emphasis circuit 60 is input to a summer 64. The output a(t) of the summer is input to a voltage controlled amplifier (VCA) 66 having a transform defined as A which is a function of the output of the first rms detector 46. The output of the VCA 66 is input to the subtractor 62. The output b(t) of the subtractor 62 is input to a de-emphasis circuit 68 having a transform defined as 1/S. The output y(t) of the de-emphasis circuit 68 is fed back to the summer 64. The system gain G(s) is derived as follows:

$$
\begin{aligned}
a(s) &= Sx(s) + y(s) \\
b(s) &= -x(s) - Aa(s) = -x(s) - ASx(s) - Ay(s) \\
&= -x(s)(1 + AS) - Ay(s) \\
y(s) &= (1/S)b(s) = (1/S)(-x(s)(1 + AS) - Ay(s)) \text{ or} \\
(S &+ A)y(s) = -(1 + AS)x(s) \\
G(s) &= y(s)/x(s) = -(1 + AS)/(A + S) \\
&= -A(S + 1/A)/(S + A)
\end{aligned}
$$

Figure 3:
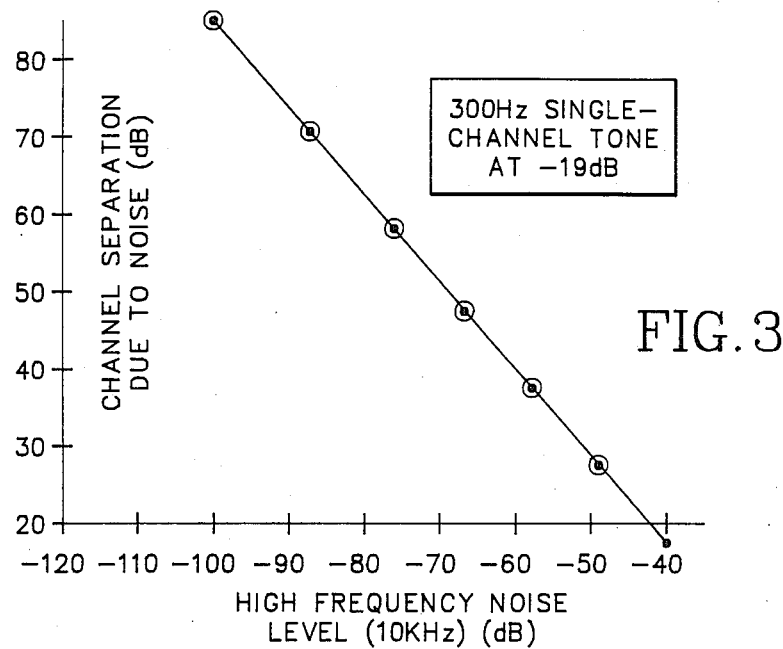
FIG. 3 is a graph illustrating the effects of high frequency noise on signal separation.
Figure 2:
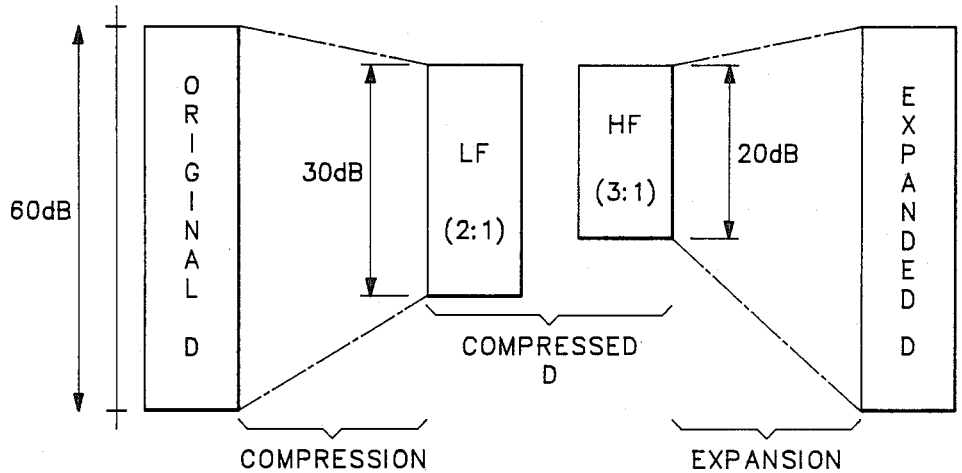
FIG. 2 is a representation of a BTSC compression/expansion signal process.

As A gets very large, G(s) approaches −S; as A gate very small, G(s) approaches −1/S; and for A=1, G(s) =−1. The overall response is a pole/zero filter whose pole frequency increases with increasing VCA gain and whose zero frequency decreases with increasing CCA gain. The output of the first rms detector 46 from which the VCA gain is obtained is a function of the high frequency portion of the input signal as indicated by the filter function Q(f) of FIG. 6(a). Thus if there is a high frequency signal present, even as little as −80 dB due to noise, the gain of the VCA is affected. This introduces a significant phase error into the processing of a low frequency tone signal when the high frequency signal is an unknown signal, such as noise, which results in limiting the maximum separation between channels for that tone as shown in FIG. 3 for a 10 kHZ "noise" signal at various levels.

Figure 8:
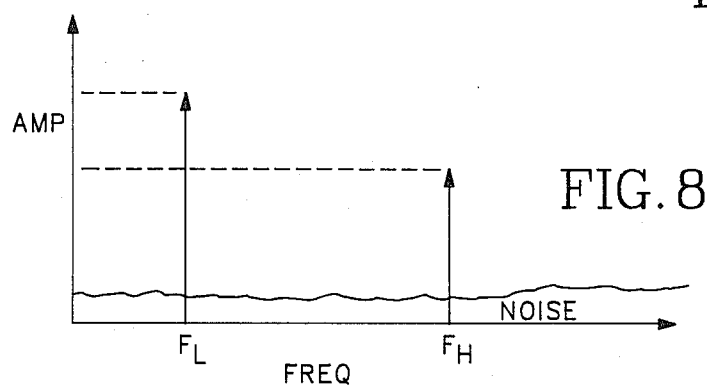
FIG. 8 is a frequency domain representation of a two-tone test signal according to the method of the present invention

Introduction of a high frequency tone causes the gain of the VCA 66 to be affected by a known amount which is consistent and is not affected by system noise. Referring now to FIG. 8 a low frequency tone $F_L$, such as 291.375 Hz at about ten percent equivalent modulation level, is the reference test tone and a high frequency tone $F_H$, such as 9906.76 HZ at a lower level, e.g. −30 dB, are applied as the two-tone test signal. The amplitude of the high frequency tone is high enough to override the noise, but remains low enough so that after processing the high frequency tone does not interfere with the stereo separation measurement for the low frequency tone. If the two-tone test signal is digitally generated, the two tones may be added mathematically, both the sum and difference components, and synthesized according to the BTSC compression specification to produce a perfect left-only signal for both tones. The resulting signal levels into and out of an ideal expander are:

| Freq. | Amp. (dB) | Exp. Gain | Out (dB) | D/M | Phase |
|---|---|---|---|---|---|
| 291.375 | −19.400 | −0.687 | −20.087 | −0.606 | 38.465 |
| 9906.76 | −30.000 | −35.822 | −65.822 | −22.243 | 17.698 |

D/M and Phase refer to the ratio and phase difference of the difference and main channel inputs to obtain a left-only L signal. As is readily seen the high frequency tone is 45 dB down from the low frequency tone, allowing for the measurement of the signal separation for the low frequency tone without interference from the high frequency tone.

Thus the present invention provides a method for calibrating a test instrument for measuring signal separation of a BTSC stereo audio transmission system by adding a high frequency test tone to a reference low frequency test tone, the high frequency test tone being of a lower amplitude so as not to affect the separation measurement for the low frequency tone, but being high enough to override system noise.

What is claimed is:

1. A method for calibrating the low frequency response of a test instrument for a BTSC transmission system comprising the steps of:
   applying a test signal to the input of the test instrument, the test signal having a low frequency test tone and a lower level high frequency noise masking test tone and being synthesized to produce a single audio channel output signal;
   demodulating the single audio channel output signal to obtain a main component and a difference component;
   expanding the difference component according to BTSC specifications;
   combining the main component with the expanded difference component to produce two signal channel outputs; and
   measuring channel separation between the two signal channel outputs for the low frequency test tone.

2. In a test instrument for determining channel separation between two channels of a transmission system having nonlinear processing, a method of calibrating low frequency response of the test instrument comprising the steps of:
   applying a composite test signal to the input of the test instrument, the composite test signal having a low frequency test tone and a lower level high frequency noise masking tone;
   deriving from the composite test signal at the output of the test instrument, using specifications of the transmission system, separate output signals for the two channels; and
   measuring channel separation between the separate output signals for the low frequency test tone.

3. A method as recited in claim 2 further comprising the step of synthesizing the composite test signal from the low frequency test tone and the lower level high frequency nose masking tone within the test instrument for application to the input of the test instrument.

4. A method as recite in claim 2 wherein the deriving step comprises the steps of:
   demodulating the composite test signal to obtain a main component signal and a difference component signal;
   expanding the component signals according to the transmission system specifications; and
   combining the expanded component signals to produce the separate output signals.

* * * * *